United States Patent [19]

Huang et al.

[11] Patent Number: 5,557,663
[45] Date of Patent: Sep. 17, 1996

[54] MULTI-MEDIA COMMUNICATION SYSTEM WITH INTEGRATED AND COHERENT AUDIO-VIDEO USER INTERFACE ALLOWING FLEXIBLE IMAGE INPUT

[75] Inventors: Shu-Chen Huang, Young-Mei; Yu-Lin Chao; Jeng-Yeong Tyan, both of Hsin-Chu, all of Taiwan

[73] Assignee: Industrial Technology Research Institute, Hsinchu, Taiwan

[21] Appl. No.: 389,151

[22] Filed: Feb. 15, 1995

[51] Int. Cl.$^6$ ................................................. H04M 11/00
[52] U.S. Cl. .............................................. 379/110; 348/14
[58] Field of Search .................... 348/14–16, 373–375, 348/552; 379/110, 93–99, 428, 431, 434, 455; 355/64, 21

[56] References Cited

U.S. PATENT DOCUMENTS 5,012,348   4/1991   Witzel et al. ............................ 348/373
5,247,330   9/1993   Ohyama et al. ......................... 355/64
5,436,654   7/1995   Boyd et al. .............................. 348/15

Primary Examiner—Wing F. Chan
Attorney, Agent, or Firm—Bo-In Lin

[57] ABSTRACT

An audio-video user interface for a multimedia communication system is disclosed in this invention. the integrated audio-video user interface includes a base-support for supporting the integrated audio-video interface. The base-support further includes a plurality of audio input and output devices. the audio-video user interface further includes a multi-direction adjustable support for supporting a video input device such as a video camera. The adjustable support is securely attached to the base support and is flexibly adjustable for directing the video input device for pointing to different directions. The audio-video user interface is ready to perform a multi-media communication once connected to a compatible computer with an audio interface card, a video interface card and an integrated service digital network (ISDN) interface card.

7 Claims, 4 Drawing Sheets

MULTI-MEDIA COMMUNICATION SYSTEM WITH INTEGRATED AND COHERENT AUDIO-VIDEO USER INTERFACE ALLOWING FLEXIBLE IMAGE INPUT

BACKGROUND OF THE INVENTION

1. Field of the Invention

This invention relates generally to system configuration and design method for a multi-media communication system. More particularly, this invention relates to system configuration and integrated design technique for a multi-media communication system wherein the video camera, the image processing equipment, and the voice communication device, e.g., the telephone are integrated to function in an integrated manner suitable for video-phone and simultaneous document viewing application.

2. Description of the Prior Art

The configuration of a conventional multi-media communication system is limited by the difficulties that separate video cameras or image input devices are often required to capture the image of persons and documents. In addition, the video and audio user interfaces are often handled separately. A multi-media communication user has to purchase several separate devices in order to configure a system suitable for performing audio and video communication tasks. A multi-media communication system thus becomes more costly and difficult to manage. The multi-media communication is often less effective and unable to achieve simultaneous audio, video, and digital data transmissions in a coherent and meaningful fashion as it is originally designed to accomplish.

Please refer to FIG. 1 where a conventional multi-media communication system is shown. The multi-media communication system includes a monitor 1, a host computer 2, a keyboard 3, a video processing subsystem 4 and a audio processing system, e.g., a telephone 5. The monitor 1 is usually used to display the image of the content of the communication and the person on the other end of the telephone line to whom the communication is made. On the other hand, the images of the persons making the communication and the document or pictorial data for transfer to the receiving party are generally inputted through the video processing subsystem 4, which in most cases is a video camera or a charge coupled device (CCD). The CCD device has a definite advantage because of its small size and weight. Referring to the functional block diagram of FIG. 2 which shows that the host computer 2 includes three interface elements. They are a video interface card 6, a video interface card 7, and an integrated service digital network (ISDN) card 8. The video interface card 6 and the video interface card 7 receive and process video and audio input signals and convert these signals into compressed formats compatible with the ISDN standard. The ISDN standard compatible data can then be transferred through the ISDN network via the ISDN interface card and the telephone lines to the receiving party to accomplish the tasks of multi-media communication. By employing the host computer 2 with the interface cards 6, 7 and 8, the multi-media communication with communication contents conveyed in the forms of voices, images, and digital signals is achieved.

The multi-media communication system as shown in FIGS. 1 and 2, are limited by the difficulties that the audio and video input are processed separately and independently. In addition to the voice communication as that performed in a conventional telephone system, the multi-media communication system also involves the audio and digital data processes. The digital process is mostly managed by the host computer 2 and transparent to the user. However, the audio and video input and output and their interfaces are intimately user oriented. In separating the audio and video interfaces as two independent functions as that shown in FIGS. 1 and 2, the convention multi-media communication system cause many inconveniences to a user. One can be easily appreciate that since the video interface, e.g., a CCD device or a video camera, in a conventional system is employed mostly for inputting the image of a person, a separate video input device with its own focus and alignment mechanisms are required when an image of a document is to be transmitted via the communication lines to the receiving end. Usually, a second video camera with it own interface card is required in the host computer is necessary. Additional manipulation of the focus and the image process of the document for communication must be managed by a user in order to accomplish the purpose of making communication with voice while showing a document simultaneously.

Therefore, a need still exists in the art of multi-media communication to provide a new and improved system configuration to overcome the difficulties caused by this inconvenience to the users that the document images and the audio signals cannot be easily managed for simultaneously transfer over a multi-mediate communication channel.

SUMMARY OF THE PRESENT INVENTION

It is therefore an object of the present invention to provide an integrated audio-video user interface for a multimedia communication system such that the aforementioned difficulties and limitations in the prior art can be overcome.

Specifically, it is an object of the present invention to provide an integrated audio-video user interface for a multimedia communication system such that the user input of the audio and video signals can be managed in a more coherent manner.

Another object of the present invention is to provide an integrated audio-video user interface for a multimedia communication system to allow more flexible image input such that the multimedia communication can be conducted in a more effective and meaningful manner.

Another object of the present invention is to provide an integrated audio-video user interface for a multimedia communication system such that the communication system can be configured more conveniently at lower costs.

Briefly, in a preferred embodiment, the present invention includes an audio-video user interface for a multimedia communication system, the integrated audio-video user interface includes a base-support means for supporting the integrated audio-video interface thereon wherein the base-support means further including a plurality of audio input and output devices, the audio-video user interface further includes a multi-direction adjustable supporting means for supporting a video input means thereon, the adjustable supporting means being securely attached to the base support means and being flexibly adjustable for directing the video input means for pointing to different directions. The audio-video user interface is ready to perform a multi-media communication once connected to a compatible computer with an audio interface card, a video interface card and an integrated service digital network (ISDN) interface card.

It is an advantage of the present invention that it provides an integrated audio-video user interface for a multimedia communication system such that the user input of the audio and video signals can be managed in a more coherent manner.

Another advantage of the present invention is that it provides an integrated audio-video user interface for a multi-media communication system to allow more flexible image input such that the multimedia communication can be conducted in a more effective and meaningful manner.

Another advantage of the present invention is that it provides an integrated audio-video user interface for a multimedia communication system such that the communication system can be configured more conveniently at lower costs.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 3A:
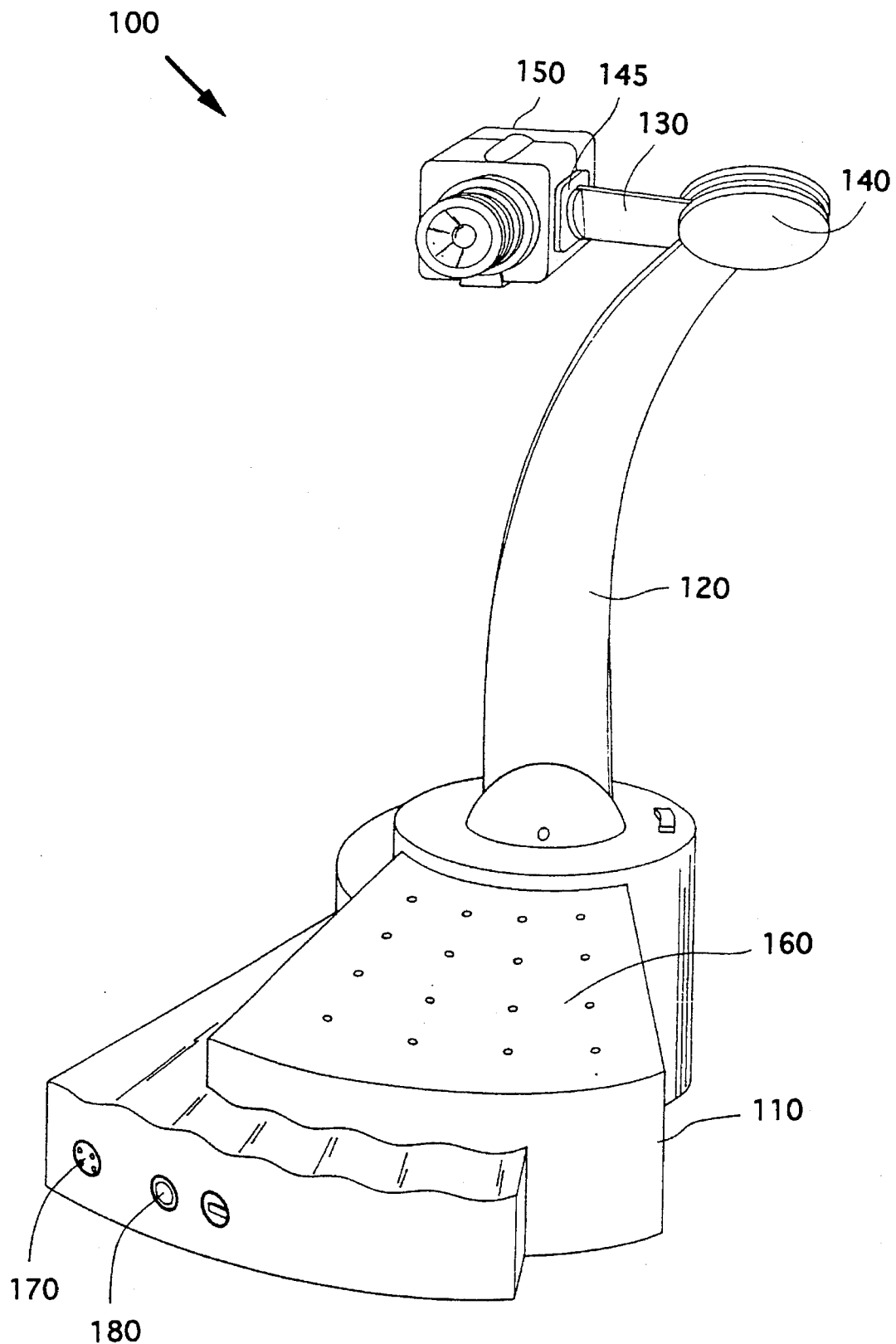
FIG. 3A is a perspective view of an integrated audio-video user interface system of the present invention.

Please refer to FIG. 3A for an integrated audio-video user interface system 100 for a multi-media communication system of the present invention. The audio-video user interface system 100 is employed in this invention to replace the video processing subsystem 4 and the audio processing system, e.g., a telephone 5 of FIG. 1. The audio-video user interface system 100 includes a base-support 110 for supporting the entire structure of the interface system 100 thereon. The base support system 110 includes audio input and output devices such as the microphone 170 for receiving a user's audio input and a loud speaker 160 for providing audio output. The base-support 110 further includes an ear-phone outlet 180 to allow a connection of an earphone. These audio input and output devices greatly enhance the convenience and ease of operation of a multi-media communication system.

The audio-video user interface system further includes a flexibly bendable arm 120 securely attached to the base-support 110. The bendable arm 120 extends upwardly with a rotatable coupling gear 140 attached at the top end. A video camera 150 is mounted via a rotational mounting mechanism 145 onto an extending arm 130 which extends laterally from the coupling gear 140. In FIG. 3A the photo lens of the video camera 150 is shown to focus on a point along a horizontal direction which is perpendicular to the plane of the paper. In this horizontal focus position, the video camera 150 is used to input the image of the persons, i.e., the callers, making the multi-media communication. Alternatively, in FIG. 3B, the video camera 150 is rotated by the use of the rotational mounting mechanism 145 to focus downwardly to a document which may be placed on the surface of a table (not shown) which most likely is a table used to support this audio-video user interface system 100. The flexibly bendable arm 120, the rotatable coupling gear 140, the extending arm 130 and the rotatable mounting means 145 thus form a multi-direction adjustable supporting means for the video camera 150. By mounting on and thus supported by this multi-direction adjustable supporting means, the video camera 150 can be easily adjusted to focus on callers, on documents or other objects intended for image transmission to the receiving party.

Figure 3B:
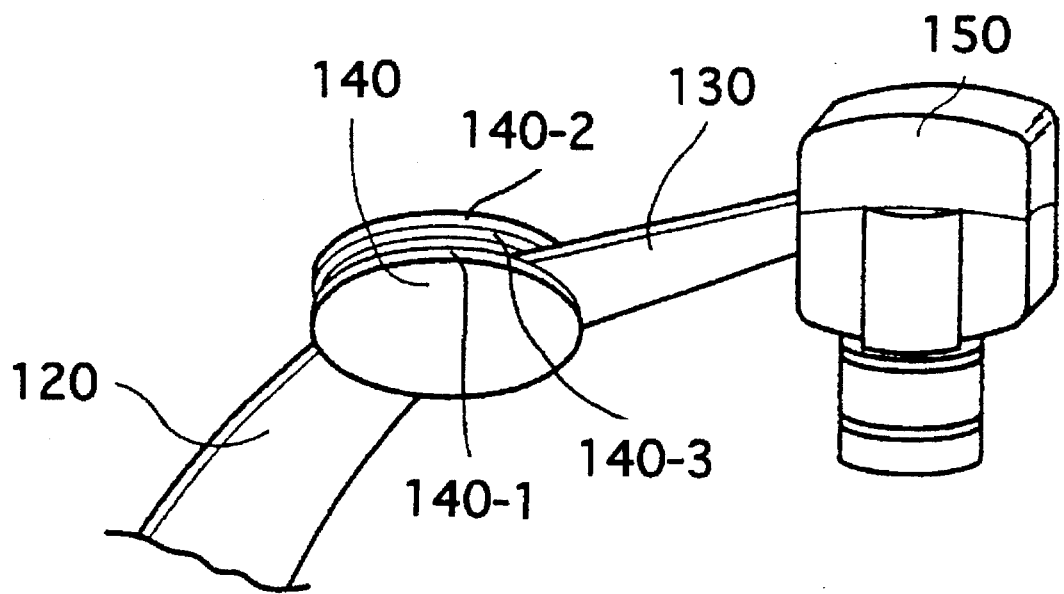
FIG. 3B is a perspective view of a portion of the audio-video user interface system of FIG. 3A showing the video camera turned to a document viewing position.

In this particular preferred embodiment as shown in FIGS. 3A and 3B, the flexibly bending arm 120 is bent away in a curve shape from the base-support 110 such that more room is available for the placement of document next to the support 110. The rotatable coupling hear 140 is employed to rotate parallel to the top surface of the base-support 110 such that the callers and the document can be located at different angular positions with respect to the base support 110. The rotatable mounting means 145 is employed to direct the video camera to face different angles. The video camera 150 can be easily adjusted to focus on the face(s) of caller(s) or to a document placed on the table next to the base support 110. In a particular embodiment, the rotatable coupling gear 140 includes a bottom fixed plate 140-1 with a portion of the edge securely attached to the bendable arm 120. The rotatable coupling gear 140 also includes a top fixed plate 140-2 and a rotational plate 140-3. A rotational shaft (not shown) disposed near the center of these plates and is rotationally attached to the bottom and top fixed plates 140-1 and 140-2. The rotational shaft is securely attached to the middle rotational plate 140-3 while the rotational plate 140-3 is securely attached to the extending arm 130. Thus, the extending arm 130 is rotatable with the middle rotational plate 140-3 relating to the top and bottom fixed plates 140-1 and 140-2 along the rotation shaft as a rotational axis.

Figure 1:
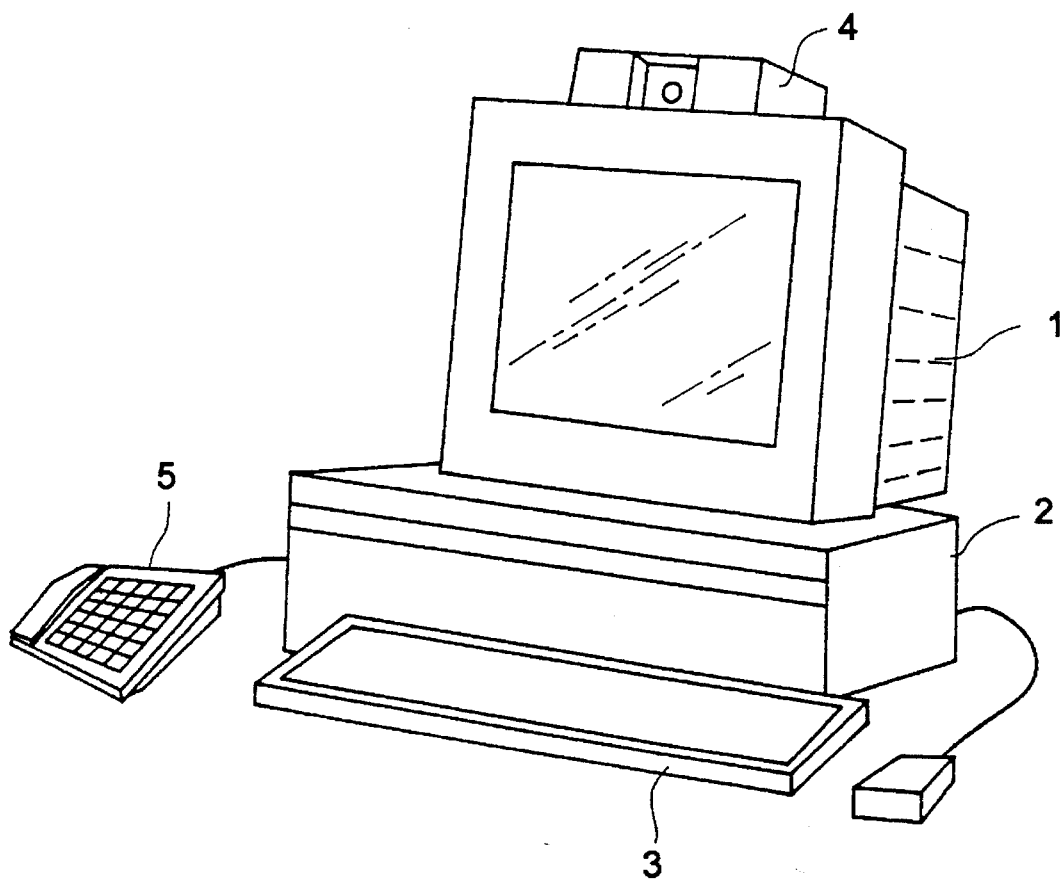
FIG. 1 is a perspective view of a conventional multi-media communication system.
Figure 2:
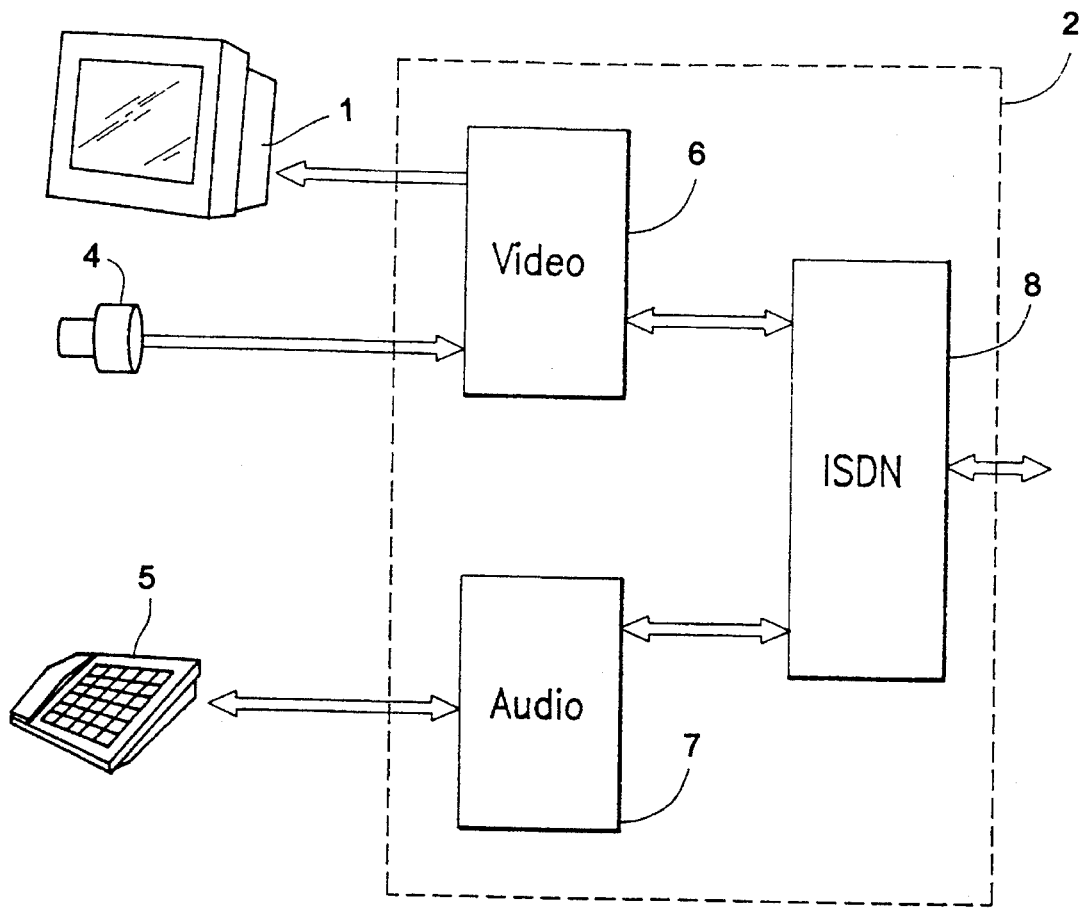
FIG. 2 is a functional block diagram showing the processing functions performed by the multi-media communication system of FIG. 1.

The audio-video user interface system 100 thus provides an integrated user interface system for a multi-media communication system as that shown in FIGS. 1 and 2. The input audio and video signals received from the this user interface 100 are then transmitted to the host computer 2, i.e., to the audio and video interface cards, to be further processed. Meanwhile the audio output signals received by the host computer 2 are transmitted from the audio interface card to the loud speaker 170 or the ear-phone outlet 180 to the user. For the purpose of set up a multi-media communication system, a user is only required to purchase the audio-video user interface 100 of this invention and connected it to a compatible multi-media computer including the audio, video and ISDN interface cards. A user can easily configure a multi-media communication system without requiring the purchase of many devices separately. A multi-media communication system can therefore be more conveniently configured at a lower cost.

In summary, the present invention discloses an integrated audio-video user interface 100 for a multi-media communication system. The audio-video user interface 100 includes a base-support means 110 for supporting the integrated audio-video interface thereon wherein the base-support means further including a plurality of audio input and output devices. the audio-video user interface further includes a multi-direction adjustable supporting means, i.e., the flexibly bendable arm 120, the rotatable coupling gear 140, the extending arm 130 and the rotatable mounting means 145, for supporting a video input means, e.g., a video camera 150, thereon, the adjustable supporting means being securely attached to the base support means 110 and being flexibly adjustable for directing the video input means 150 for pointing to different directions. The audio-video user interface 100 is ready to perform a multi-media communication once connected to a compatible computer with an audio interface card, a video interface card and an integrated service digital network (ISDN) interface card. In a preferred embodiment, the multi-direction adjustable supporting means further includes a bendable arm 120 securely attached to the base support 110 and extending upwardly for connecting to a rotatable coupling gear 140 on a top end of the bendable arm 120. The multi-direction adjustable supporting means further includes an extending arm 130 having a first and a second ends wherein the first end being coupled to the rotatable coupling gear 140 and the second end being coupled to a rotatable mounting means 145 for mounting the video input device 150 thereon, the extending arm 130 being rotatable relative to the bendable arm 120 via the rotatable coupling gear 140 and the video input device 150 being rotatable relative to the extending arm 130 via the rotatable mounting means 145. In another preferred embodiment, the rotatable coupling gear 140 including a bottom fixed plate 140-1 securely attached to the bendable arm 120, a top fixed top plate 140-2 and a rotatable plate 140-3 disposed between the fixed top and bottom plates 140-1 and 140-2. The rotatable coupling gear 140 further including a rotatable shaft disposed near the center of the fixed top, the fixed bottom, and the rotatable plates wherein the rotatable plate 140-3 attached to the rotatable shaft and the extending arm 130 thus allowing the extending arm 130 to rotate substantially in a horizontal plane relative to the fixed top and bottom plates 140-1 and 140-2, along with the rotation shaft as a rotational axis.

Therefore, the present invention provides an integrated audio-video user interface for a multimedia communication system such that the user input of the audio and video signals can be managed in a more coherent manner. The audio-video user interface system allows more flexible image input such that the multimedia communication can be conducted in a more effective and meaningful manner. The video camera can be conveniently adjusted to capture images of different objects such as the persons' faces or documents. Because a user only needs to purchase the audio-video user interface of this invention and connected it to a suitable multi-media host computer, the communication system can be configured more conveniently at lower costs.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. An integrated audio-video user interface for a multi-media communication system comprising:

a base-support means for supporting said integrated audio-video interface thereon wherein said base-support means further including a plurality of audio input and output devices;

a video input means; and a multi-direction adjustable supporting means for supporting said video input means thereon, said adjustable supporting means being securely attached to said base support means and being flexibly adjustable for directing said video input means for pointing to different directions.

2. The integrated audio-video interface of claim 1 wherein:

said audio-video user interface being ready to perform a multi-media communication once connected to a compatible computer with an audio interface card, a video interface card and an integrated service digital network (ISDN) interface card.

3. The integrated audio-video interface of claim 1 wherein said multi-direction adjustable supporting means further includes:

a bendable arm having a bottom and a top ends wherein said bottom end securely attached to said base support means and said bendable arm extending upwardly therefrom;

a rotatable coupling gear connected to said top end of said bendable arm;

an extending arm having a first and a second ends wherein said first end being coupled to said rotatable coupling gear; and a rotatable mounting means being coupled to said second end of said extending arm for mounting said video input device thereon, said extending arm being rotatable relative to said bendable arm via said rotatable coupling gear and said video input device being rotatable relative to said extending arm via said rotatable mounting means.

4. The integrated audio-video interface of claim 3 wherein:

said rotatable coupling gear including a bottom fixed plate securely attached to said bendable arm, a top fixed top plate and a rotatable plate disposed between said fixed top and bottom plates; and said rotatable coupling gear further including a rotatable shaft disposed near the center of said fixed top, said fixed bottom, and said rotatable plates wherein said rotatable plate attached to said rotatable shaft and said extending arm thus allowing said extending arm to rotate substantially in a horizontal plane relative to said fixed top and bottom plates along with said rotation shaft as a rotational axis.

5. The integrated audio-video interface of claim 4 wherein:

said plurality of audio input and output devices in said base-support means further including a microphone for receiving user audio input, a loud speaker and an ear phone outlet for providing audio output signals.

6. The integrated audio-video interface of claim 5 wherein:

said video input device mounted on said rotatable mounting means being a charged couple device (CCD) camera.

7. An integrated audio-video user interface for a multi-media communication system comprising:

a base-support means for supporting said integrated audio-video interface thereon wherein said base-support means further including a plurality of audio input and output devices, wherein said plurality of audio input and output devices further including a microphone for receiving user audio input, a loud speaker and an ear phone outlet for providing audio output signals;

a multi-direction adjustable supporting means for supporting a video input means thereon, said adjustable supporting means being securely attached to said base support means and being flexibly adjustable for directing said video input means for pointing to different directions;

said multi-direction adjustable supporting means further includes a bendable arm securely attached to said base support and extending upwardly for connecting to a rotatable coupling gear on a top end of said bendable arm;

said multi-direction adjustable supporting means further includes an extending arm having a first and a second ends wherein said first end being coupled to said rotatable coupling gear and said second end being coupled to a rotatable mounting means for mounting said video input device thereon, said extending arm being rotatable relative to said bendable arm via said rotatable coupling gear and said video input device being rotatable relative to said extending arm via said rotatable mounting means;

said rotatable coupling gear including a bottom fixed plate securely attached to said bendable arm, a top fixed top plate and a rotatable plate disposed between said fixed top and bottom plates;

said rotatable coupling gear further including a rotatable shaft disposed near the center of said fixed top, said fixed bottom, and said rotatable plates wherein said rotatable plate attached to said rotatable shaft and said extending arm thus allowing said extending arm to rotate substantially in a horizontal plane relative to said fixed top and bottom plates along with said rotation shaft as a rotational axis; and said audio-video user interface being ready to perform a multi-media communication once connected to a compatible computer with an audio interface card, a video interface card and an integrated service digital network (ISDN) interface card.

* * * * *